US012645491B2

(12) United States Patent　　　(10) Patent No.: US 12,645,491 B2

Chocron et al.　　　(45) Date of Patent: Jun. 2, 2026

(54) TECHNIQUES FOR CLEARING THE INTERNAL STATE OF A LIBRARY

(71) Applicant: HYPERPLANE LTD., Beit Dagan (IL)

(72) Inventors: Moshe Chocron, Ashdod (IL); Alexander Winokur, Ramat Gan (IL)

(73) Assignee: HYPERPLANE LTD., Beit Dagan (IL)

( * ) Notice: Subject to any disclaimer, the term of this patent is extended or adjusted under 35 U.S.C. 154(b) by 121 days.

(21) Appl. No.: 18/574,353

(22) PCT Filed: Sep. 12, 2022

(86) PCT No.: PCT/IB2022/058568

§ 371 (c)(1),
(2) Date: Dec. 27, 2023

(87) PCT Pub. No.: WO2023/037330

PCT Pub. Date: Mar. 16, 2023

(65) Prior Publication Data

US 2024/0289164 A1　　　Aug. 29, 2024

Related U.S. Application Data

(60) Provisional application No. 63/243,221, filed on Sep. 13, 2021.

(51) Int. Cl.
G06F 9/48　　　(2006.01)

(52) U.S. Cl.
CPC ...... G06F 9/4862 (2013.01); *G06F 2209/509* (2013.01)

(58) Field of Classification Search
CPC .......................... G06F 9/4862; G06F 2209/509

(Continued)

(56) References Cited

U.S. PATENT DOCUMENTS 8,595,271 B1 * 11/2013 Patwardhan ............ G06F 16/11
　　　　　　　　　　　　　　　　　　707/790
10,649,790 B1 * 5/2020 Ingegneri .............. G06F 9/4405
　　　　　　　　　　　(Continued)

FOREIGN PATENT DOCUMENTS

WO　　WO-2020192448 A1 * 10/2020 ........... G06F 9/4856

OTHER PUBLICATIONS

Boehm, "Software Engineering," IEEE Transactions on Computers, vol. C-25, No. 12, pp. 1226-1241, Dec. 1976.

(Continued)

*Primary Examiner* — Moustafa M Meky
*Assistant Examiner* — Kidest Mendaye
(74) *Attorney, Agent, or Firm* — Meitar Patents LTD.; Daniel Kligler

(57)　　　　ABSTRACT

A method, including receiving a request to migrate an executing application (34) that includes a library (42) having functions (46) configured to generate a log (92) tracking library resources (106). Upon suspending the application while the library has a current state (160), the library is unloaded from memory (24), and upon unloading the library, any pending resources allocated to the library are identified. The identified resources are deallocated so as to define a cleaned version of the application that does not include any of the allocated resources, and the cleaned version of the application is migrated to a destination machine (180). Execution of the migrated application is resumed on the destination machine so as to link the migrated application to an additional instance of the library, and the log is replayed so as to bring the linked additional instance of the library on the destination machine to the current state.

20 Claims, 10 Drawing Sheets

(58) Field of Classification Search
USPC .......................................................... 709/202
See application file for complete search history.

(56) References Cited

U.S. PATENT DOCUMENTS

| | | | |
|---|---|---|---|
| 10,868,825 B1 * | 12/2020 | Dominessy | H04L 43/045 |
| 2016/0110359 A1 * | 4/2016 | Underwood | G06F 11/3457 707/648 |
| 2016/0247248 A1 * | 8/2016 | Ha | G06F 9/45558 |
| 2017/0093988 A1 * | 3/2017 | Rehaag | H04L 67/568 |
| 2017/0308449 A1 * | 10/2017 | Mangione-Tran | G06F 11/0778 |
| 2018/0217836 A1 * | 8/2018 | Johnson | G06F 9/28 |
| 2019/0121662 A1 | 4/2019 | Zhao et al. | |
| 2019/0213032 A1 * | 7/2019 | Eyal | G06F 9/455 |
| 2019/0361750 A1 * | 11/2019 | Sequeira | H04L 9/3268 |
| 2020/0034167 A1 | 1/2020 | Parthasarathy et al. | |
| 2020/0201648 A1 * | 6/2020 | Memon | G06F 9/3851 |
| 2020/0364240 A1 * | 11/2020 | Martin | G06F 16/273 |
| 2021/0232441 A1 * | 7/2021 | Lee | G06F 11/3624 |
| 2021/0303327 A1 * | 9/2021 | Vu | G06T 1/20 |
| 2022/0012087 A1 | 1/2022 | Zheng et al. | |
| 2022/0197811 A1 * | 6/2022 | Ganguly | G06F 13/16 |

OTHER PUBLICATIONS

Nvidia Corporation, "CUDA Runtime API-CUDA Toolkit Documentation," p. 1-619, Aug. 2021.
Nvidia Corporation, "CUDA C++ Programming Guide," pp. 1-420, Aug. 2021, as downloaded from https://web.archive.org/web/20210908205243/https://docs.nvidia.com/cuda/pdf/CUDA_C_Programming_Guide.pdf.
criu.org, "Checkpoint/Restore in Userspace," pp. 1-2, Nov. 3, 2020, as downloaded from https://criu.org/Main_Page.
"Berkley Lab Checkpoint/Restart (BLCR) for Linux," pp. 1-4, Sep. 24, 2021, as downloaded from https://crd.lbl.gov/divisions/amcr/computer-science-amcr/class/research/past-projects/BLCR/.
Sourceforge, "DMTCP: Distributed MultiThreaded CheckPointing," pp. 1-5, May 4, 2022, as downloaded from.
Kerrisk, "mmap(2)—Linux manual page," pp. 1-13, update Aug. 12, 2021, as downloaded from https://web.archive.org/web/20210812204236/https://man7.org/linux/man-pages/man2/mmap.2.html.
Kerrisk, "proc(5)—Linux manual page," pp. 1-60, update Aug. 19, 2021, as downloaded from https://web.archive.org/web/20210819132712/https://man7.org/linux/man-pages/man5/proc.5.html.
Kerrisk, "dlopen(3)—Linux manual page," pp. 1-9, update Aug. 15, 2021, as downloaded from https://web.archive.org/web/20210815104050/https://man7.org/linux/man-pages/man3/dlopen.3.html.
Kerrisk, "signal(2)—Linux manual page," pp. 1-3, update Aug. 1, 2021, https://web.archive.org/web/20210801194930/ttps://man7.org/linux/man-pages/man2/signal.2.html.
Garg et al., "CRUM: Checkpoint-Restart Support for CUDA's Unified Memory", pp. 1-22, Aug. 1, 2018, as downloaded from https://arxiv.org/pdf/1808.00117.pdf.
Jain et al., "CRAC: Checkpoint-Restart Architecture for CUDA with Streams and UVM," SC '20: Proceedings of the International Conference for High Performance Computing, Networking, Storage and Analysis, article No. 77, pp. 1-14, Nov. 2020.
International Application # PCT/IB2022/058568 Search Report dated Dec. 28, 2022.

* cited by examiner

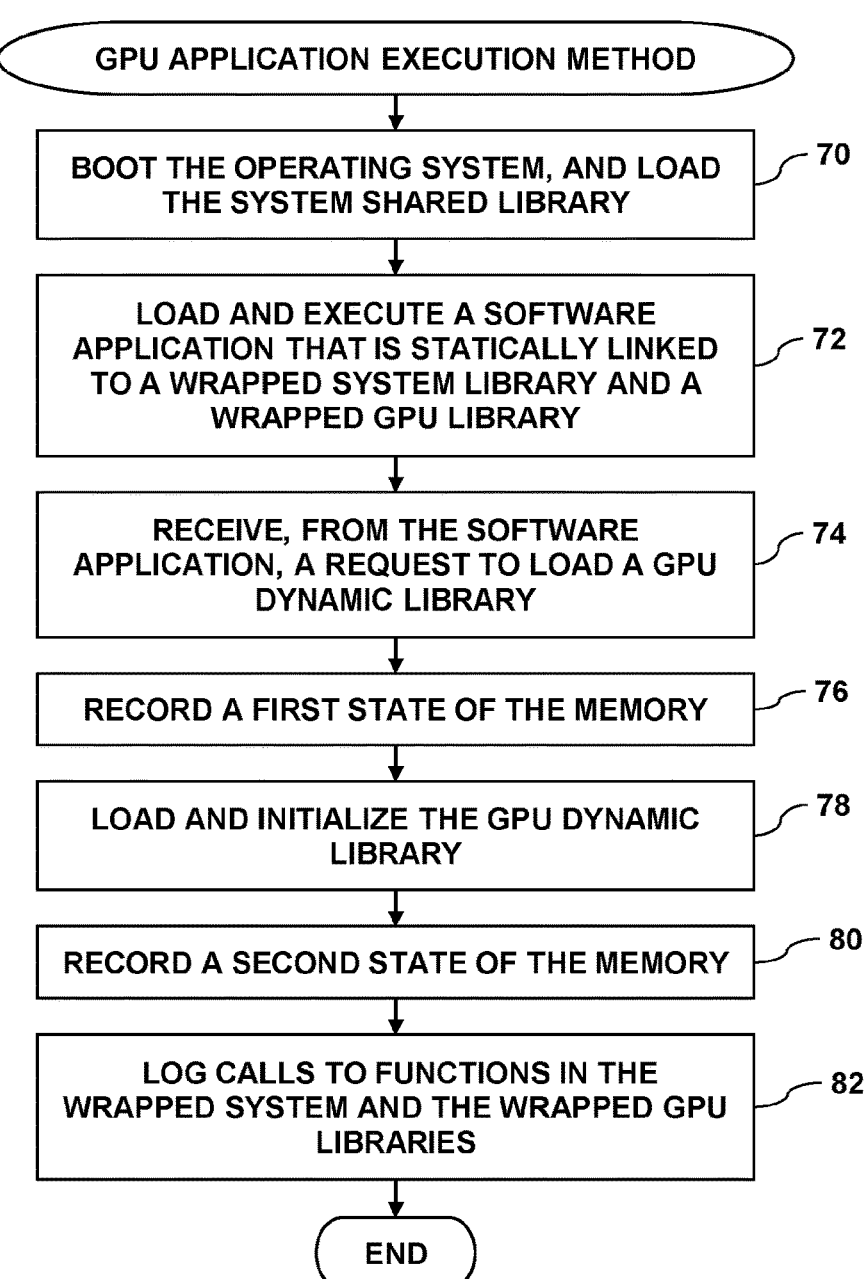

GPU APPLICATION EXECUTION METHOD

BOOT THE OPERATING SYSTEM, AND LOAD THE SYSTEM SHARED LIBRARY — 70

LOAD AND EXECUTE A SOFTWARE APPLICATION THAT IS STATICALLY LINKED TO A WRAPPED SYSTEM LIBRARY AND A WRAPPED GPU LIBRARY — 72

RECEIVE, FROM THE SOFTWARE APPLICATION, A REQUEST TO LOAD A GPU DYNAMIC LIBRARY — 74

RECORD A FIRST STATE OF THE MEMORY — 76

LOAD AND INITIALIZE THE GPU DYNAMIC LIBRARY — 78

RECORD A SECOND STATE OF THE MEMORY — 80

LOG CALLS TO FUNCTIONS IN THE WRAPPED SYSTEM AND THE WRAPPED GPU LIBRARIES — 82

END

REGISTER
162

— 22

HOST
PROCESSOR

163

GPU
MEMORY

— 28

168

166

HEAP MEMORY
ALLOCATION
110B

DYNAMIC
MEMORY
ALLOCATION 108B

HANDLE
112B

LOCK
117B

THREAD
114B     116B

DYNAMIC LIBRARY RESOURCES 106B

STATIC
VARIABLE
104

164

STATIC
MEMORY REGION 102

HOST MEMORY 24

TECHNIQUES FOR CLEARING THE INTERNAL STATE OF A LIBRARY

CROSS-REFERENCE TO RELATED APPLICATIONS

This application claims the benefit of U.S. Provisional Patent Application 63/243,221, filed Sep. 13, 2021, which is incorporated herein by reference.

FIELD OF THE INVENTION

The present invention relates generally to migrating software applications, and specifically to migrating a software application that accesses functions in a dynamic library for a stateful hardware peripheral. Although embodiments of the present invention relate to a dynamic library, these embodiments are also applicable to a static library, as a static library can be easily converted to a dynamic library.

BACKGROUND OF THE INVENTION

Application migration is the process of moving software applications from one computing environment to another. Examples of application migration include, but are not limited to, migrating an application from a first server in a first data center to a second server in a second data center, migrating an application from a public to a private cloud, and migrating an application company's on-premises server to a cloud provider's environment.

Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The description above is presented as a general overview of related art in this field and should not be construed as an admission that any of the information it contains constitutes prior art against the present patent application.

SUMMARY OF THE INVENTION

There is provided, in accordance with an embodiment of the present invention, a method including receiving, by a first machine, a request to migrate an application that is executing in a memory of the first machine, wherein the application includes a first instance of a dynamic library having one or more functions, generating a log including resources allocated to and deallocated from the first instance of the dynamic library in response to executing the application, suspending execution of the application while the first instance of the dynamic library has a current state, unloading the first instance of the dynamic library from the memory, identifying, subsequent to unloading the first instance of the dynamic library, any of the resources that were allocated to the first instance of the dynamic library and that are still pending, deallocating the identified resources so as to define a cleaned version of the application that does not include any of the allocated resources, migrating the cleaned version of the application to a second machine, resuming execution of the migrated application on the second machine so as to link the migrated application to a second instance of the dynamic library, and replaying the log so as to bring the linked second instance of the dynamic library on the second machine to the current state.

In one embodiment, the first instance of the dynamic library controls a stateful hardware peripheral.

In another embodiment, the stateful hardware peripheral includes a hardware accelerator.

In an additional embodiment, the hardware accelerator includes a Graphics Processing Unit (GPU) having a GPU memory.

In a further embodiment, the source machine includes a first GPU, wherein the second machine includes a second GPU, wherein migrating the cleaned version of the application includes copying data stored in the GPU memory of the first GPU to the GPU memory of the second GPU, and wherein the current state includes the data stored in the GPU memory of the first GPU.

In another embodiment, the current state includes a current software state, wherein the first machine includes a first stateful hardware having a current hardware state upon suspending the application, wherein the second machine includes a second stateful hardware, and wherein replaying the logs brings the second stateful hardware to the current hardware state.

In a supplemental embodiment, a given resource includes a heap memory allocation, wherein the current state includes the heap memory allocation and data stored in the allocated heap memory.

In some embodiments, a given resource includes a dynamic memory allocation, wherein the current state includes the dynamic memory allocation and data stored in dynamically allocated memory.

In other embodiments, a given resource includes a currently allocated device handle, wherein the current state includes the currently allocated device handle.

In additional embodiments, a given resource includes a currently allocated file handle, and wherein the current state includes the currently allocated file handle.

In further embodiments, a given resource includes a thread, wherein the current state includes the thread.

In supplemental embodiments, a given resource includes a lock, wherein the current state includes the lock.

In other embodiments, the application includes a set of wrapper functions that call the functions in the first instance of the dynamic library.

In further embodiments, suspending the application includes suspending the application upon detecting that none of the wrapper functions are currently executing.

In supplemental embodiments, identifying the resources includes recording a first state of the resources prior to loading the dynamic library, recording a second state of the resources upon loading the dynamic library, recording a third state of the resources upon suspending execution of the application, recording a fourth state of the resources upon unloading the dynamic library, wherein the fourth state of the resources includes log entries in the log including resource allocations and deallocations between second and third state, and analyzing the first, the second, the third, the fourth recorded states.

In one embodiment, recording a given state includes generating a list of the resources.

In another embodiment, recording the second state includes computing a difference in the resource allocations between the first and the second recorded states, wherein recording the third state includes adding, to the computed difference, the resource allocations recorded in the log, and wherein recording the fourth state includes computing a difference in resource allocations between the third recorded state unloading the first instance of the library, and subtracting the difference from resources allocated in the third recorded state.

In an additional embodiment, the resources that are still pending include the resources that are still in the memory, and wherein deallocating the identified resources includes deallocating the identified resources from the memory.

There is also provided, in accordance with an embodiment of the present invention, a source computer including a memory, and one or more processors configured to receive a request to migrate an application that is executing in the memory the first machine, wherein the application includes a first instance of a dynamic library having one or more functions, to generate a log including resources allocated to and deallocated from first instance of a in response to executing the application, to suspend execution of the application while the first instance of the dynamic library has a current state, to unload the first instance of the dynamic library from the memory, to identify, subsequent to unloading the first instance of the dynamic library, any of the resources that were allocated to the first instance of the dynamic library and that are still pending, to deallocate the identified resources so as to define a cleaned version of the application that does not include any of the allocated resources, and to migrate the cleaned version of the application to a destination machine, so that upon the destination machine resuming execution of the migrated application and linking the migrated application to a second instance of the dynamic library, the second machine replays the log so as to bring the linked second instance of the dynamic library to the current state.

There is additionally provided, in accordance with an embodiment of the present invention a computer software product for controlling operation of a computer, including a non-transitory computer-readable medium, in which program instructions are stored, which instructions, when read by a computer, cause the computer to receive, by a first machine, a request to migrate an application that is executing in a memory of the first machine, wherein the application includes a first instance of a dynamic library having one or more functions, to generate a log including resources allocated to and deallocated from the first instance of the dynamic library in response to executing the application, to suspend execution of the application while the dynamic library has a current state, to unload the dynamic library from the memory, to identify, subsequent to unloading the first instance of the dynamic library, any of the resources that were allocated to the first instance of the dynamic library and that are still pending, to deallocate the identified resources so as to define a cleaned version of the application that does not include any of the allocated resources, and to migrate the cleaned version of the application to a destination machine, so that upon the destination machine resuming execution of the migrated application and linking the migrated application to a second instance of the dynamic library, the second machine replays the log so as to bring the linked second instance of the dynamic library to the current state.

BRIEF DESCRIPTION OF THE DRAWINGS

The disclosure is herein described, by way of example only, with reference to the accompanying drawings, wherein:

FIG. 2 is a flow diagram that schematically illustrates a method of executing the software application, in accordance with an embodiment of the present invention;

DETAILED DESCRIPTION OF EMBODIMENTS

Figure 1:
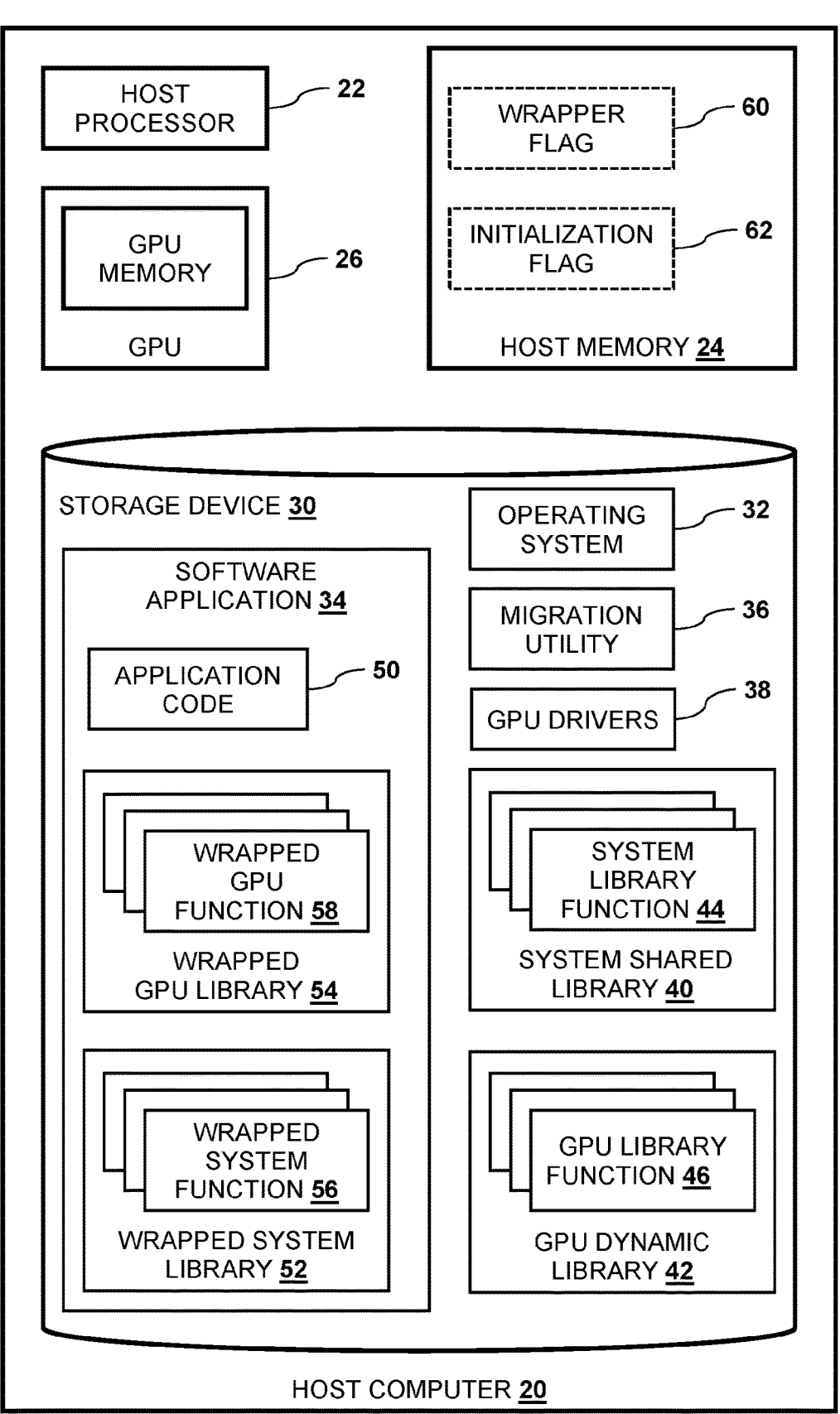
FIG. 1 is a block diagram that schematically illustrates a host computer configured to execute, from a memory, a software application that calls functions in a dynamic library, in accordance with an embodiment of the present invention.

A dynamic library comprises a set of functions that can be connected (i.e., via dynamic linking or dynamic loading) to a software application during application runtime. When migrating a software application comprising (i.e., linked to) a dynamic library, both the state of the software application and the state of the dynamic library need to be preserved. In embodiments described herein, Examples of utilities that can be used to suspend, migrate and resume execution of a software application include, but are not limited to:

CRIU™ (https://criu.org/Main_Page)

BLCR™ (https://crd.lbl.gov/departments/computer-science/elass/research/past-projects/BLCR/

DMTCP™ (http://dmtcp.sourceforge.net/)

These utilities typically operate on the following basic assumptions:

1. Most of the application's state is maintained in process memory as process variable values, and the rest of the state can be easily obtained via standard calls to the operating system. These calls can be used to obtain all the register values, the program counter file handles and any other information maintained by the operating system about the process.

2. The process/application uses standard hardware peripherals like disk drives communication ports etc., and in typical embodiments, these peripherals are under the control of the operating system. In these embodiments, the operating system initializes them, maintains their state in the kernel address space, and arbitrates them between different processes and/or applications.

3. The internal hardware state is not typically maintained in the process address space.

However, there are instances when these assumptions are not valid. For example, if the application uses an NIVDIA™ graphics processing unit (provided by NVIDIA Corporation, 2788 San Tomas Expressway, Santa Clara, CA 95051, USA) via the NVIDIA™ Computer Unified Device Architecture (CUDA™) GPU library, then the migration utility may fail due to one or more of the following issues:

Initialization of the graphics processing unit (GPU) is typically performed by the application. Therefore, the GPU may not be initialized on the new server unless some additional logic is added to the application.

An application that uses a GPU typically maintains part of its process state within the GPU's memory and internal registers. While a migration utility will typically transfer all the application's memory contents and its other state information when migrating the application to a destination machine, it will typically not transfer contents of the GPU memory and will typically not restore the GPU registers. Therefore, when the migrated application resumes execution on the destination machine, the application may fail since this state information is missing.

The GPU library may open special device handles and/or file handles to the GPU hardware which the migration utilities may not know how to handle.

As opposed to hardware peripherals that maintain their respective states in the operating system memory space, GPU libraries typically maintain part of its state in the application memory space. This can create significant obstacles for initializing the GPU after the application migration, since the GPU may fail to be correctly initialized as part of the application migration unless this state is first cleared.

In order to successfully migrate applications using a CUDA™ library, the CUDA™ state needs to be cleared in the applications memory. This is because CUDA™ initializes the GPU on the first CUDA™ function call. Once initialized, CUDA™ marks somewhere in the applications address space that the GPU is already initialized so that CUDA™ will not try to reinitialize the GPU and the GPU drivers upon receiving any additional CUDA™ function calls. Therefore, any attempt to reinitialize the GPU on another machine necessitates to zero out these traces of past GPU initialization. Unless one is very familiar with the CUDA™ logic, it is extremely difficult (if not impossible) to determine memory addresses need to be reset.

Embodiments of the present invention provide methods and systems for seamlessly migrating an application that uses a dynamic library (e.g., CUDA™) by completely resetting the internal effects of all operations performed by the library. As described hereinbelow, a first machine receives a request to migrate an application that is executing in a memory of the first machine, wherein the application comprises a first instance of a dynamic library having one or more functions. While executing the application, a log is recorded comprising resources allocated to and deallocated from the first instance of the dynamic library (and the order of these allocations and deallocations) in response to executing the application is generated.

Upon receiving the request, execution of the application is suspended while the first instance of the dynamic library has a current state, and the first instance of the dynamic library is unloaded from the memory. Subsequent to unloading the first instance of the dynamic library, any of the resources that were allocated to the first instance of the dynamic library and that are still pending are identified and deallocated (i.e., from the first machine) so as to define a cleaned version of the application that does not comprise any of the allocated resources.

The cleaned version of the application is migrated to a second machine, and execution of the migrated application is resumed on the second machine so as to link the migrated application to a second instance of the dynamic library. Finally, the log is replayed (i.e., on the second machine) so as to bring the linked second instance of the dynamic library on the second machine to the current state.

As described hereinbelow, the logs may comprise respective sets of entries that indicate resources allocated to and deallocated from the first instance of the dynamic library. In some embodiments, the software library manages underlying stateful hardware, and the current state comprises a corresponding state of the hardware when the application is suspended. In these embodiments, replaying these entries can initialize the dynamic library and restore the state of the underlying stateful hardware to the current state. Using the log entries to restore the current state is described in *Boehm. Software engineering. IEEE Transactions on Computers, C-25(12):1226-1241, 1976*, also referred to herein simply as Reference 1.

By identifying resources (e.g., memory, file handles, locks and threads) allocated to dynamic libraries, systems implementing embodiments of the present invention enable deallocating (i.e., "cleaning") the resources allocated internally by a wrapper library that is agnostic and independent of the dynamic library, and can be implemented without any need to understand or modify the internal logic of the dynamic library and the application (i.e., and therefore does not require any knowledge or understanding of the underlying implementation). Systems implementing embodiments of the present invention also enable deallocating these resources without running the library in a dedicated address space and without any need to modify the logic of the software application calling the library.

While resources described herein comprise memory, handles, locks, and threads, other embodiments may require identifying additional operating system resources such as communication sockets and mounts. These additional resources are considered to be within the spirit and scope of the present invention. These additional resources can be identified using the same embodiments described herein (e.g., by inspecting the corresponding proc file for the resource and by interposing on the corresponding operating system functions that manage these resources, as described hereinbelow).

System Description

FIG. 1 is a block diagram that schematically shows an example of a host computer 20, in accordance with an embodiment of the present invention. Host computer 20 may comprise a host processor 22, a host memory 24, a graphics processing unit (GPU) processor 26 comprising a GPU memory 28, and a storage device 30.

In the configuration shown in FIG. 1, host computer 20 is in a "powered-off" state, and storage device 30 stores a set of software entities comprising an operating system 32, a software application 34, a migration utility 36 (e.g., CRIU, LCR or DMTCP, as described supra), GPU drivers 38, a system shared library 40 and a GPU dynamic library 42 (also referred to herein simply as dynamic library 42).

System shared library 40 comprises a set of system library functions 44. In embodiments where operating system 32 comprises a LINUX™ distribution, system shared library 40 may comprise libc (i.e., the standard C library) that comprises functions 44 such as mmap( ), munmap( ), malloc( ), free( ), open( ), fclose( ), pthread_create( ), pthread_exit( ), pthread_mutex_init( ), pthread_mutex_lock( ), pthread_mutex_unlock( ), and pthread_mutex_destroy( ).

Dynamic library 42 comprises a set of GPU library functions 46. For example, dynamic library 42 may comprise the libcudart CUDA™ library, and functions 46 may comprise CUDA™ functions. While embodiments herein describe migrating application 34 that is dynamically linked to library 42 comprising functions 46 that manage GPU 26, using these embodiments to migrate any software application that is dynamically linked to a library comprising functions that control any other type of stateful hardware peripheral (i.e., a hardware device/peripheral that holds a state that can be extracted and loaded back) is considered to be within the spirit and scope of the present invention. Examples of these other types of hardware include, but are not limited to accelerators (wherein GPU 16 is an example of an accelerator, application specific integrated circuits (ASICs), field-programmable gate arrays (FPGAs), Internet of things (IOT) devices, external compute arrays and devices, and adapter cards to specialized hardware.

There are instances when a software developer may want to replace a library implementation at runtime so as to change the behavior of the library. For example, the developer may want to add some accounting or tracing functionality to a given function 44 such as mmap( ).

To replace a given function (having a given name) in a given dynamic library, a software developer can generate an "interposing" version of the given function (i.e., the "intended" function) with the same name. The goal is to have the interposing function intercept calls to the given function. In some embodiments, upon intercepting the call to the given function, the interposing function calls the given function (with any intercepted parameters and/or any other parameters), and receive, from the called given function, a response to the call. In these embodiments, the interposing function can then perform operations based on any input parameters or results from the given function.

In embodiments herein, interposing functions are referred to as "wrapped" functions, and the interposing functions are stored to a wrapped library. In the configuration shown in FIG. 1, software application 34 comprises application code 50 that is statically linked to a wrapped system library 52 and a wrapped GPU library 54.

In the configuration shown in FIG. 1, wrapped system library 52 comprises a set of wrapped system functions 56. In some embodiments, resource allocation and resource free functions can be "wrapped" so as to track which resources need to be explicitly released before migration can take place. In these embodiments, processor 22 only tracks calls to functions 44 that are called by GPU library functions 46. This can be done by inspecting the return address of the wrapper (i.e., in a given called wrapped system function 56). If the return address is in the range of addresses of the CUDA library (as described hereinbelow), then processor 22 can record the function and its respective parameters. In some embodiments, processor 22 can identify the return address by calling, from the corresponding wrapper function, _builtin_return_address( ) (as described in https://man.netbsd.org/NetBSD-6.1/_builtin_return_address.3).

The following is an example of wrapper logic that can be used in wrapped system functions 56:

```
Address = ___builtin_return_address(1)
If address in the range of library address space Then
{
    record function name and parameters
}
Call function
return
```

In the configuration shown in FIG. 1, wrapped GPU library 54 comprises a set of wrapped GPU functions 58. In embodiments described herein, wrapped functions 58 can track operations performed by GPU library functions 46. For example, wrapped functions 58 can record operations such as allocating, loading and clearing GPU memory 28.

The following paragraphs comprise guidelines for implementing wrapped GPU library 54.

For a given GPU library function 46, a corresponding wrapped GPU function 58 can be created with the same name and the same function arguments signature as the given GPU library function. Wrapped GPU library 54 can then be created out of these wrapped GPU functions and application 34 can be linked to the wrapped GPU library instead to (i.e., the original) dynamic library 42. This "wrapping" mechanism helps ensure that the code logic in wrapped GPU functions 58 is implemented in a manner that its existence is transparent to the application logic in application code 50, so that the application logic does not need to be altered on account of the wrapping mechanism. This wrapping mechanism can be implemented for any dynamic library.

In some embodiments when executing software application 34, memory 24 may comprise the following flags (typically initially set to zero) that wrapped GPU functions 58 can monitor and manage:

Wrapper flag 60. Processor 22 can set flag 60 upon entry to a given wrapped GPU function 58 and reset flag 60 upon exit from the given wrapped GPU function. The purpose of this flag will be explained in the description referencing FIG. 5 hereinbelow.

Initialization flag 62—Processor 22 can set flag 62 subsequent to initializing GPU 26. Processor 22 typically sets flag 62 upon the first time any wrapped GPU function 58 (and therefore the first time a given GPU library function 46) is called. Once flag 62 is set, the initialization logic of embodiments described herein will not be executed again, thereby ensuring that this logic is executed only once.

Processor 22 typically executes the state recording logic described hereinbelow once, on the first call to any of the wrapped GPU functions (and consequently the first time of any GPU library functions). Processor 22 executes this if initialization flag 62 is not set (i.e., has the value of zero). Once processor 22 executes the logic, the processor sets flag 62 (e.g., to a value of one). This can ensure that processor 22 executes recording of any resources associated with the initialization of dynamic library 42 only once.

For specific (i.e., a subset of) wrapped GPU functions 58, typically the functions that initialize the state of GPU 26, and the functions that allocate and deallocate memory on the GPU, processor 22 also records the function name and its parameters so that it can be later replayed when software application 34 is restarted on the machine to which it was migrated, as described in Reference 1 cited supra.

The following is an example of logic that can be used to record the state of dynamic library 42:

1. The code logic records (i.e., identifies and saves) the current state of the memory used so far by application 34. In this embodiment, this is accomplished by reading the /proc/[pid]/maps file (as described in https:// man7.org/linux/man-pages/man5/proc.5.html). This file reflects the kernel data structure associated with memory allocations layout for process ID of the software application. This file provides information about all the address ranges of the software application, shared or dynamically loaded libraries, including file paths to the core application software and all the libraries being used (i.e., any static and/or dynamic libraries).

2. The code logic records also state of any opened file handles and opened threads by reading the/proc/[pid]/ fdinfo file for information about any open files handles and the /proc/[pid]/task file for information about any opened threads. Note, that at this point none of the recorded resources belong to dynamic library 42, as it has not yet been loaded.

3. The code logic dynamically loads dynamic library 42. This can be accomplished by explicitly executing dlopen( ) with the RTLD_NOW flag (as described in https://man7.org/linux/man-pages/man3/ dlopen.3.htmf) to guarantee resolution of all the GPU library functions.

4. The code logic reads (i.e., again) the current state of memory 24, and the states of any open file handles and threads. The difference between the resources as recorded prior to opening dynamic library 42 and after opening the dynamic library are the resources that are allocated on account of initializing the dynamic library (and not by calls to wrapper functions 58 for functions 46). These resources are saved in the corresponding resource's sequential lists and will have to be explicitly cleared if they are still allocated after the dynamic library is closed. The resources allocated by the GPU library functions as a result of the execution of application 34 are traced differently as explained hereinbelow.

5. The code logic registers a signal handler which will handle a request to execute the application migration, as described hereinbelow.

6. Based on the extracted memory map the code logic separately records the memory address range and the other resources allocated by dynamic library after it was loaded. This information will be used to identify mmap( )/munmap( ), malloc( )/free( ), fopen( ) pthread_ create( ), pthread_exit( ), pthread_mutex_ init( ), pthread_mutex_lock( ), pthread_mutex_ unlock( ), and pthread_mutex_destroy( ) calls executed on behalf of the dynamic library per embodiments describe herein. The resources will have to be explicitly cleared (i.e., unless freed already by the owning library itself) at migration time when the library in unloaded.

7. The code logic in each given wrapped GPU function 58 calls the corresponding GPU library function (i.e., the original interposed GPU library function). Steps 6 and 7 are typically executed on each invocation of any wrapped GPU function(s) 56, not just the first time.

The following is an example of logic that can be incorporated in a given wrapped GPU function 58. In this example, variable InCUDA refers to wrapper flag 60, and variable InitializeGPU refers to initialization flag 62:

```
Set InCUDA to 1
If this function needs to be replayed Then
     Record function name and parameters
If InitilizeGPU = 0 Then
{
   Set InitilizeGPU to 1
   Read /proc/[pid]/maps /*save memory allocations
   Read /proc/[pid]/fdinfo /*save open file handles
   Read /proc/[pid]/task /*save open threads
   Load CUDA library
   Read /proc/[pid]/maps and save the difference in memory allocations
   Read /proc/[pid]/fdinfo and save the difference in open file handles
   Read /proc/[pid]/task and save the difference in open threads
   Register the migrate( ) signal handler by calling signal( ) function
}
Call the function corresponding to this wrapper
Set InCUDA to zero
```

While the configuration in FIG. 1 shows operating system 32, software application 34, migration utility 36, GPU drivers 38, and libraries 40 and 42 stored on storage device 30, storing these items on any type of remote storage device is considered to be within the spirit and scope of the present invention. For example, processor 22 can retrieve software application 34 and libraries 40, 42 from a network storage device or a data cloud service.

Processor 22 comprises a general-purpose central processing unit (CPU) or special-purpose embedded processor, which is programmed in software or firmware to carry out the functions described herein. This software may be downloaded to host computer 20 in electronic form, over a network, for example. Additionally or alternatively, the software may be stored on tangible, non-transitory computer-readable media, such as optical, magnetic, or electronic memory media. Further additionally or alternatively, at least some of the functions of processor 22 may be carried out by hard-wired or programmable digital logic circuits.

Examples of memory 24 and storage device 30 include dynamic random-access memories, non-volatile random-access memories, hard disk drives and solid-state disk drives.

In some embodiments, the functionality software application 34, migration utility 36 and libraries 40, 42 may be performed by one or more external or internal virtual or tangible machines or by a remote service or underlying data cloud-based application that executes independently of the host compute cluster or externally to host computer system. Application Execution and Migration FIG. 2 is a flow diagram that schematically illustrates a method of executing software application 34, in accordance with an embodiment of the present invention.

In step 70, processor 22 boots operating system 32 and loads system shared library 40 to memory 24.

In step 72, processor 22 loads software application 34 to memory 24, and initiates execution of the software application. In embodiments described herein, software application 34 comprises application code 50 that is statically linked to libraries 52 and 54.

In step 74, processor 22 receives, from application code 50, a request to load dynamic library 42. In some embodiments dynamic library 42 may comprise a static library that processor 22 (or any processor on any computing device) converted to dynamic library 42 at the point when application code was bound to the static library when creating software application 34. Converting the static library to dynamic library 42 enables wrapper functions 58 to implement embodiments described herein when calling the functions in dynamic library 42.

In step 76, processor 22 records, in response to receiving the request to load GPU library 24, a first state of memory 24.

Figure 3:
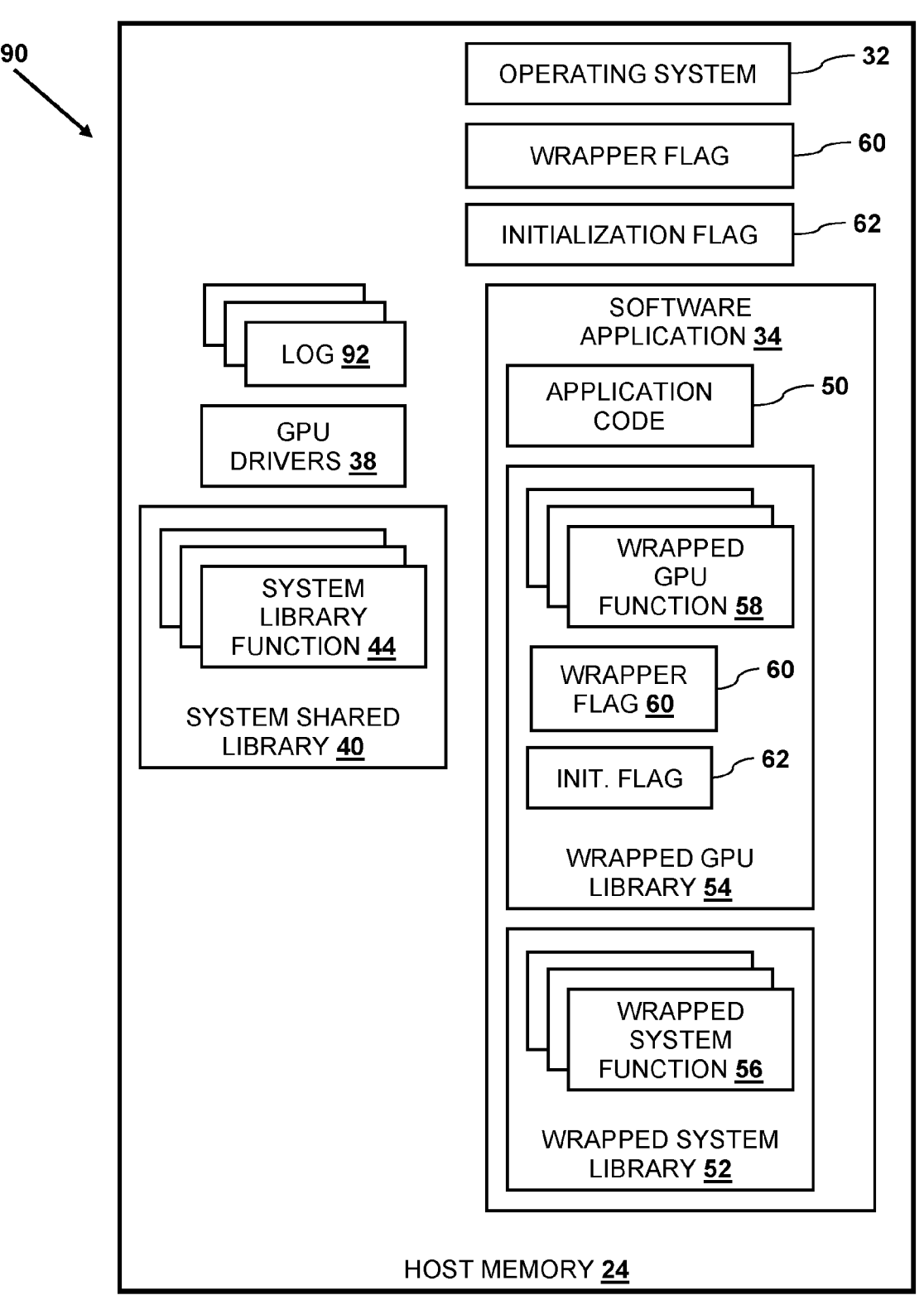
FIG. 3 is a block diagram that schematically illustrates a first state of the memory prior to loading the dynamic library, in accordance with an embodiment of the present invention.

FIG. 3 is a block diagram that schematically illustrates a first state 90 of memory 24, in accordance with an embodiment of the present invention. In the example shown in FIG. 3, memory state 90 comprises operating system 32, software application 34, library 40, GPU drivers 56, and flags 60, 62.

As described supra, wrapped functions 56 and 58 record operations performed respectively by functions 46 and 44. In some embodiments, memory 24 comprises a set of logs 92 comprising respective sets of log entries 94, and wrapped functions 56 and 58 can record their respective operations (to the log entries) in the logs. In these embodiments, memory state 90 may also comprise logs 92.

Continuing with step 78 in FIG. 2, in response to the request received in step 74, processor 22 loads and initializes dynamic library 42 (e.g., using embodiments described hereinabove).

In step 80, upon loading dynamic library 42, processor 22 records a second state of memory 22.

Figure 4:
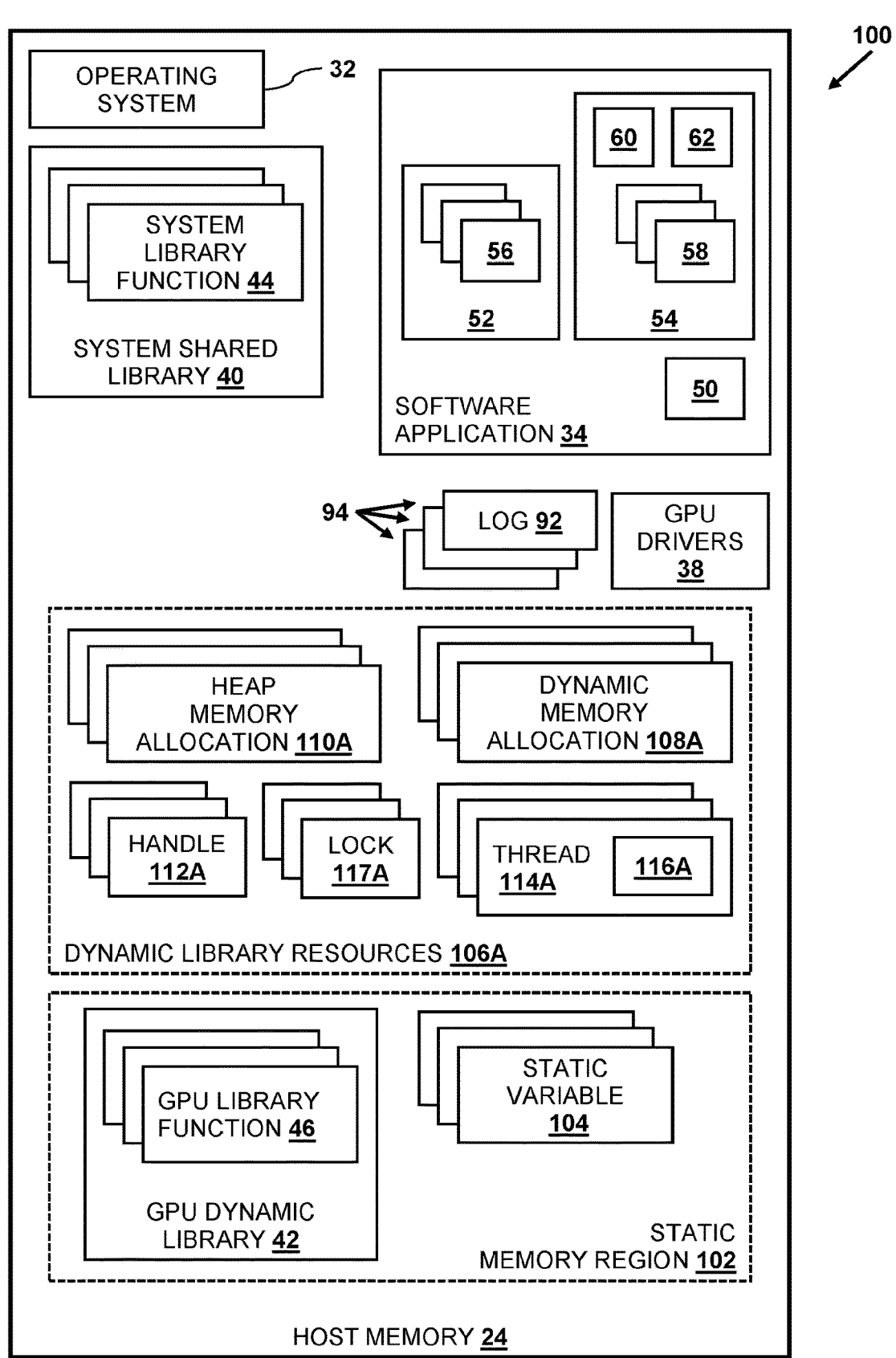
FIG. 4 is a block diagram that schematically illustrates a second state of the memory subsequent to loading the dynamic library, in accordance with an embodiment of the present invention.

FIG. 4 is a block diagram that schematically illustrates a second state 100 of memory 24, in accordance with an embodiment of the present invention. Memory state 100 differs from memory state 90 as follows:

Memory state 100 also comprises a static memory region 102 allocated (typically by the operating system's loader) on behalf of the dynamic library that stores dynamic library 42 (i.e., that processor 22 loaded to memory 24 in step 78).

Memory state 100 additionally comprises a set of dynamic library resources 106. Dynamic library resources 106 and their respective components that can be differentiated by appending a letter to the identifying numeral, so that the dynamic library resources comprise dynamic library resources 106A-106C (FIG. 4 shows dynamic library resources 106A). Dynamic library resources 106B and 106C are respective shown in FIGS. 6 and 8 and respectively described in the description referencing FIGS. 6 and 7 hereinbelow. Each set of dynamic library resources 106 comprises:

A respective set of dynamic memory allocations 108. These may comprise variables set by functions 46 using a given function 44 such as mmap( ).

A respective set of heap memory allocations 110 that were allocated on account of the dynamic library (i.e., in response to calls from the dynamic library). These may comprise variables set by functions 46 using a given function 44 such as malloc( ).

A respective set of handles 112 (e.g., for files and/or devices).

A respective set of threads 114 comprising respective thread resources 116 such as locks and singletons.

A respective set of locks 117. Locks 117 are sometimes referred to as mutexes.

In some embodiments, operating system 32 (executing on processor 22) implements handles 112, threads 114 (and their respective resources 116) and locks 117. Furthermore, some data structures associated with these resources may also be present in dynamic memory allocations 110, heap memory allocations 112 and dynamic library 42.

In embodiments where operating system 32 comprises a LINUX™ distribution, wrapped system functions 56 can be defined for system library functions 44 such as: mmap( ), munmap( ), malloc( ), free( ), open( ), fclose( ), pthread_create( ), pthread_exit( ), pthread_mutex_init( ), pthread_mutex_lock( ), pthread_mutex_unlock( ), and pthread_mutex_destroy( ).

As described supra, dynamic library resources 106 and their respective components (i.e., dynamic memory allocations 108, heap memory allocations 110, handles 112, threads 114, and thread resources 116) that can be differentiated by appending a letter to the identifying numeral so that the dynamic library resources comprise dynamic library resources 106A-106C. Therefore, the dynamic memory allocations comprise dynamic memory allocations 108A-108C, the heap memory allocations comprise heap memory allocations 110A-110C, the handles comprise handles 112A-112C, the threads comprise threads 114A-114C, and the thread resources comprise thread resources 116A-116C).

Returning to the flow diagram in FIG. 2, now that processor 22 has loaded libraries 40, 42, 52 and 54, functions 56 and 58 start recording logs 92 (by storing calls to functions 44 and 46 to the entries in the logs) in step 82, and the method ends.

Figure 5:
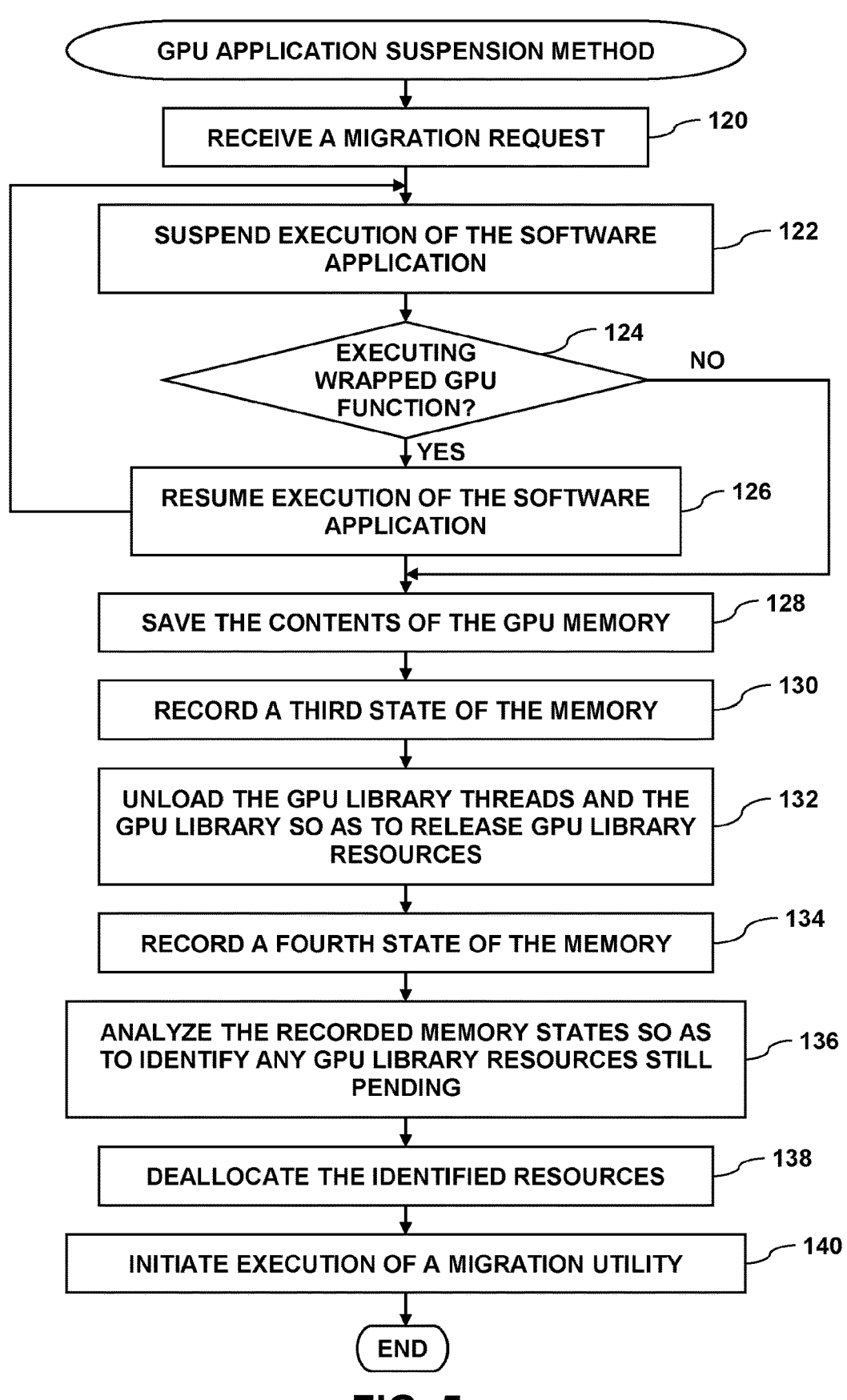
FIG. 5 is a flow diagram that schematically illustrates a method of suspending execution of the software application and deallocating resources previously allocated to the dynamic library, in accordance with an embodiment of the present invention.
Figure 6:
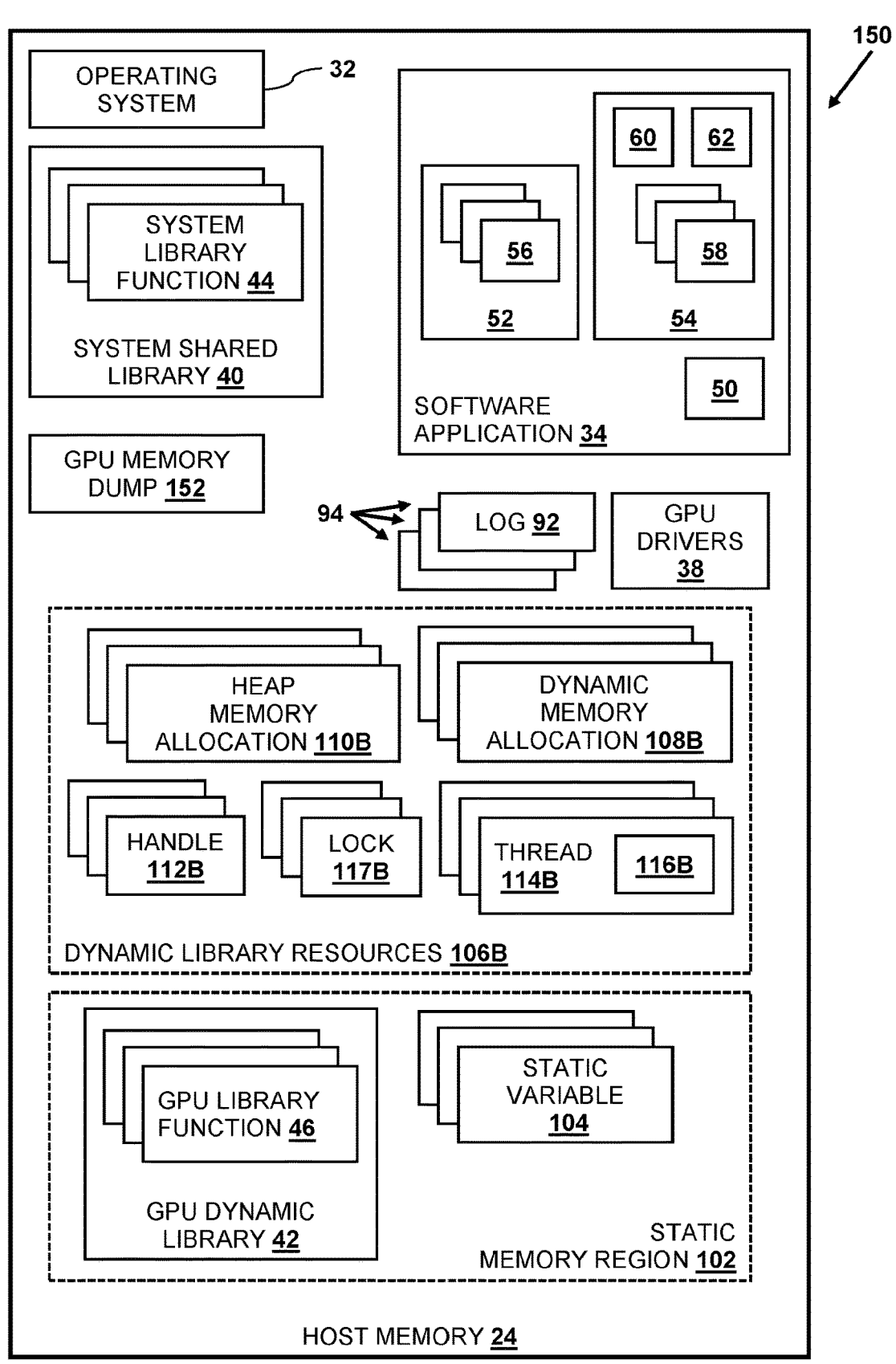
FIG. 6 is a block diagram that schematically illustrates a third state of the memory subsequent to suspending execution of the software application, in accordance with an embodiment of the present invention.

FIG. 5 is a flow diagram that schematically illustrates a method of suspending software application 34, and FIG. 6 is a block diagram that schematically illustrates a third memory state 150 of memory 24 comprising a GPU memory dump 152, in accordance with an embodiment of the present invention.

In step 120, processor 22 receives a request to migrate software application 34. At this stage, processor 22 is executing code 50 that is calling GPU library functions 46 via wrapped GPU functions 58.

In step 122, processor 22 suspends execution of software application 34.

In step 124, processor 22 determines whether or not software application 34 is currently executing a given wrapped GPU function 58. In some embodiments processor 22 can perform this determination by detecting the current value of wrapper flag 60, as described hereinabove.

If (in step 124) processor 22 determines that software application 34 is currently executing a given wrapped GPU function 58, then in step 126, the processor resumes execution of the software application (e.g., for a millisecond), and the method continues with step 122.

However, if (in step 124) processor 22 determines that software application 34 is not currently executing a given wrapped GPU function 58 (e.g., by waiting for completing execution completion of the given wrapped GPU function), then in step 128, the processor continues the suspension process by saving the data 163 of GPU memory 28 to GPU memory dump 152.

In step 130, processor 22 records third state 150 of memory 24. As shown in FIG. 6, state 150 comprises operating system 32, software application 34, system shared library 40, GPU drives 38, wrapper flag 60, initialization flag 62, updated logs 92, memory region 102, dynamic library resources 106B, and GPU memory dump 152. In dynamic library resources 106B, state 150 comprises current (i.e., upon suspension of software application 34) dynamic memory allocations 108B, heap memory allocations 110B, handles 112B, threads 114B and locks 117B.

Figure 7:
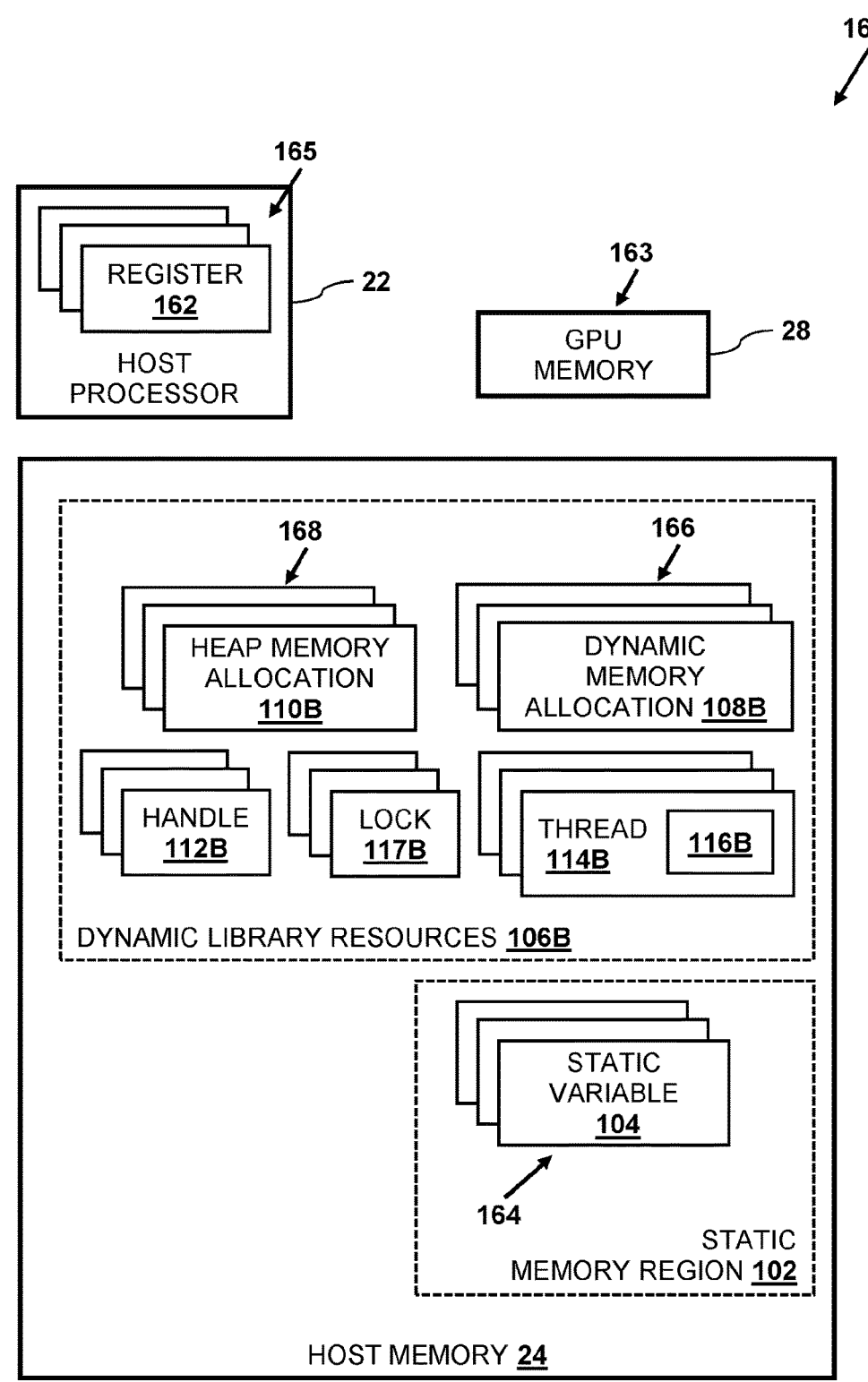
FIG. 7 is a block diagram that schematically illustrates a state of the dynamic library when execution of the software application is suspended, in accordance with an embodiment of the present invention.

FIG. 7 is a block diagram that shows a state 160 of dynamic library 42 upon processor 22 successfully suspending execution of software application 34, in accordance with an embodiment of the present invention. State 160 may also be referred to herein as library state 160.

In the configuration shown in FIG. 7, host processor 22 comprises a set of host registers 162. In some embodiments, a given register may comprise a program counter.

Upon successfully suspending software application execution 34, dynamic library 42 has state 160. In the example shown in FIG. 7, state 160 comprises:

Data 163 stored in GPU memory 28.

Data 164 stored in static memory region 102.

In dynamic library resources 106B:

Data 166 stored in dynamic memory allocations 108B.

Data 168 stored in heap memory allocations 110B.

Handles 112B.

Threads 114B.

Locks 117B.

Data 165 stored in registers 162.

In embodiments described herein, when migrating software application 34 to a destination machine, state 160 needs to be recreated on the destination machine so that the software application can resume seamlessly execution on the destination machine. In some embodiments, state 160 also comprises a state of hardware elements (e.g., registers 162, memory 24, and GPU memory 28.

Continuing with step 132 in FIG. 5, processor 22 unloads dynamic library 42 from memory 24. When unloading dynamic library 42 from memory 24, the processor attempts to deallocate dynamic library resources 106 that are currently allocated to dynamic library 42 (i.e., functions 46). In embodiments where operating system 32 comprises a LINUX™ distribution, processor 22 can unload dynamic library 42 via the dlclose( ) function. This will clean all static variables 104, and release most dynamic memory allocations 108 and heap memory allocations 110.

In step 134, processor 22 records a current state of memory 24.

In a first recording embodiment, processor 22 can identify the states by analyzing the /proc/[pid]/maps, /proc/[pid]/fdinfo, an d/proc/[pid]/task files so as to generate a list of dynamic memory allocations 108, handles 112 and threads 114, as described hereinabove. In a second recording embodiment, processor 22 can identify changes to dynamic library resources 106 by analyzing the entries in logs 92 so as to identify allocations and deallocations of dynamic library resources 106 that processor 22 performed when executing steps 120-128.

Figure 8:
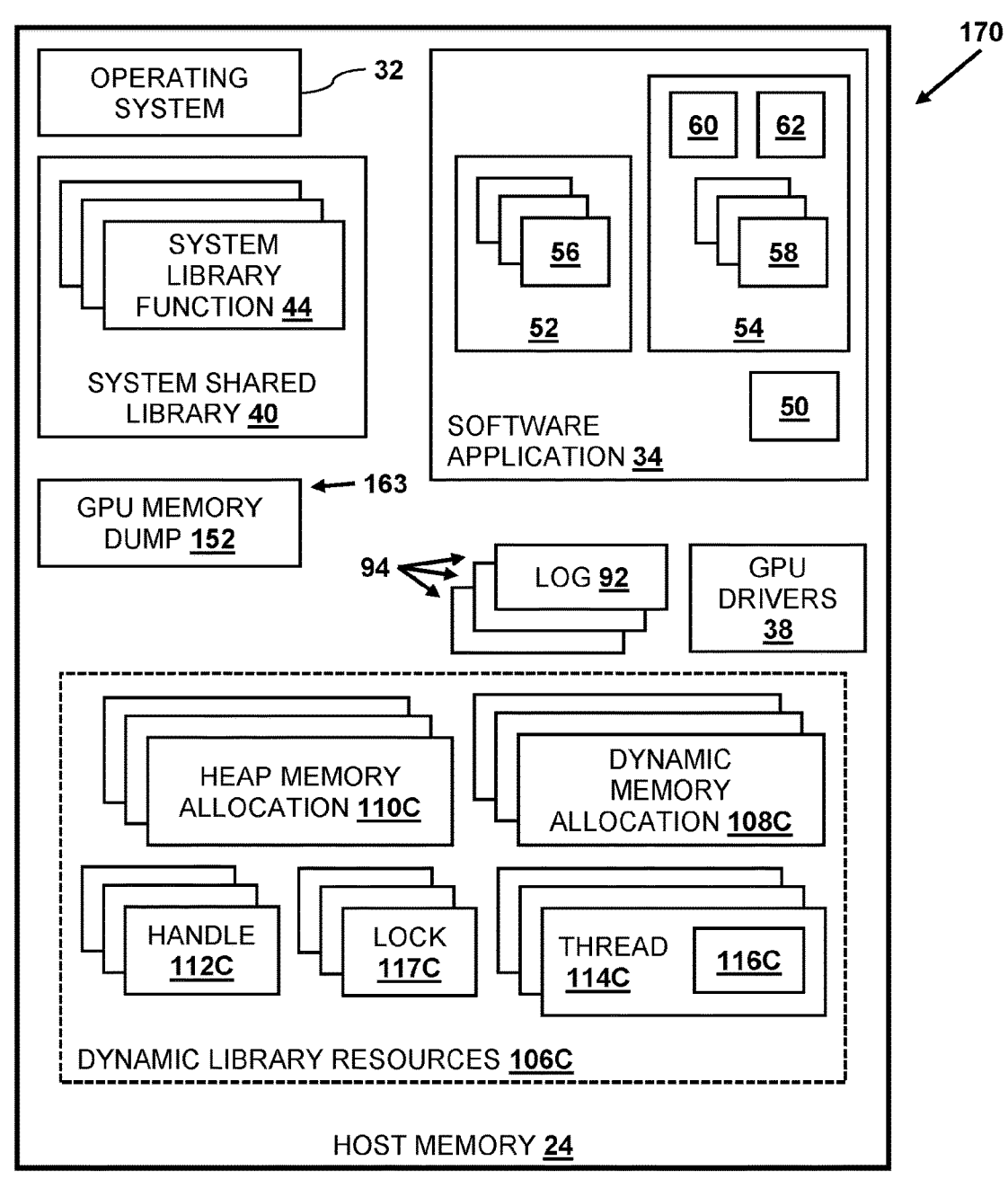
FIG. 8 is a block diagram that schematically illustrates a fourth state of the memory subsequent to unloading the dynamic library, in accordance with an embodiment of the present invention.

FIG. 8 is a block diagram that schematically illustrates an example of a fourth memory state 170 of memory 24 that processor 22 records in step 134. Differences between third state 150 and fourth state 170 may comprise differences between dynamic library resources 106B and 106C. Since state 170 is subsequent to processor 22 unloaded dynamic library 42, dynamic memory allocations 108C, heap memory allocations 110C, handles 112C, threads 114C, and locks 117C in dynamic library resources 106C comprises a subset of dynamic memory allocations 108B, heap memory allocations 110B, handles 112B, threads 114B, and locks 117B in state 150 (i.e., the resources in state 150 that processor 22 did not deallocated when unloading dynamic library 42 from memory 24).

At this point there are four memory states:

State 90 of memory 24 prior to processor 22 loading dynamic library 42 to the memory.

State 100 of memory 24 upon loading dynamic library 42 to the memory.

State 150 of memory 24 upon processor 22 suspending execution of software application 34.

State 170 upon processor 22 unloading dynamic library 42 from memory 24.

In embodiments herein, states 90, 100, 150 and 170 may also refer to the states of dynamic library resources 106 currently allocated to dynamic library 42 at the respective point in times of these states.

In step 136, processor analyzes memory states 90, 100, 150 and 170 so as to identify any dynamic library resources 106 that are still pending (i.e., in computer 20). In some embodiments, the pending library resources may comprise any of library resources 106 still managed by operating system 32 (i.e., subsequent to the processor unloading dynamic library 42 in step 132 hereinabove). Library resources 106 sill managed by operating system 32 typically comprise the library resources identifiable by the operating system, and therefore can be applied to system library functions 44 (e.g., to allocate and deallocate these resources using LINUX™ functions such as fclose and pthread_mutex_destroy). In some embodiments, these pending resources may be stored by the operating system in memory 24.

In step 138, processor 22 deallocates the resources identified in step 136. By deallocating the identified resources, processor 22 defines a "cleaned" version of software application 34.

Finally in step 140, processor 22 can execute the following steps and the method ends:

Set, in memory 24, a migration flag 194 (e.g., to "1") so as to indicate initiation of a software migration process.

Store logs 92 to storage device 30.

Store GPU memory dump 152 to storage device 30.

initiates execution of migration utility 36

Once processor 22 has deallocated the identified resources, the migration utility 36 can migrate suspended software application 34 to another (i.e., a destination) computer. In embodiments where operating system 32 comprises a LINUX™ distribution, processor 22 can deallocate the identified resources as follows:

Call pthread_cancel( ) to cancel any threads 114.

Call pthread_join( ) to wait for a given thread 114 to terminate.

Call dlclose( ) to close a given handle 112.

Call munmap( ) to deallocate a given dynamic memory allocation 108.

Call free( ) to deallocate a given heap memory allocation 110.

Call int pthread_mutex_destroy( ) to release a given lock 117C.

In embodiments described herein, processor 22 stores dynamic library resources 106 in memory 24, identifies any remaining resources in the memory (i.e., step 136), and deallocates any remaining resources (i.e., step 138). There may be instances where operating system 32 stores resources (e.g., a given file handle 112) in another storage media such as storage device 30. Therefore, processor 22 may perform the steps described herein of storing, identifying, and deallocating dynamic library resources 106 on any type of storage media.

Figure 9:
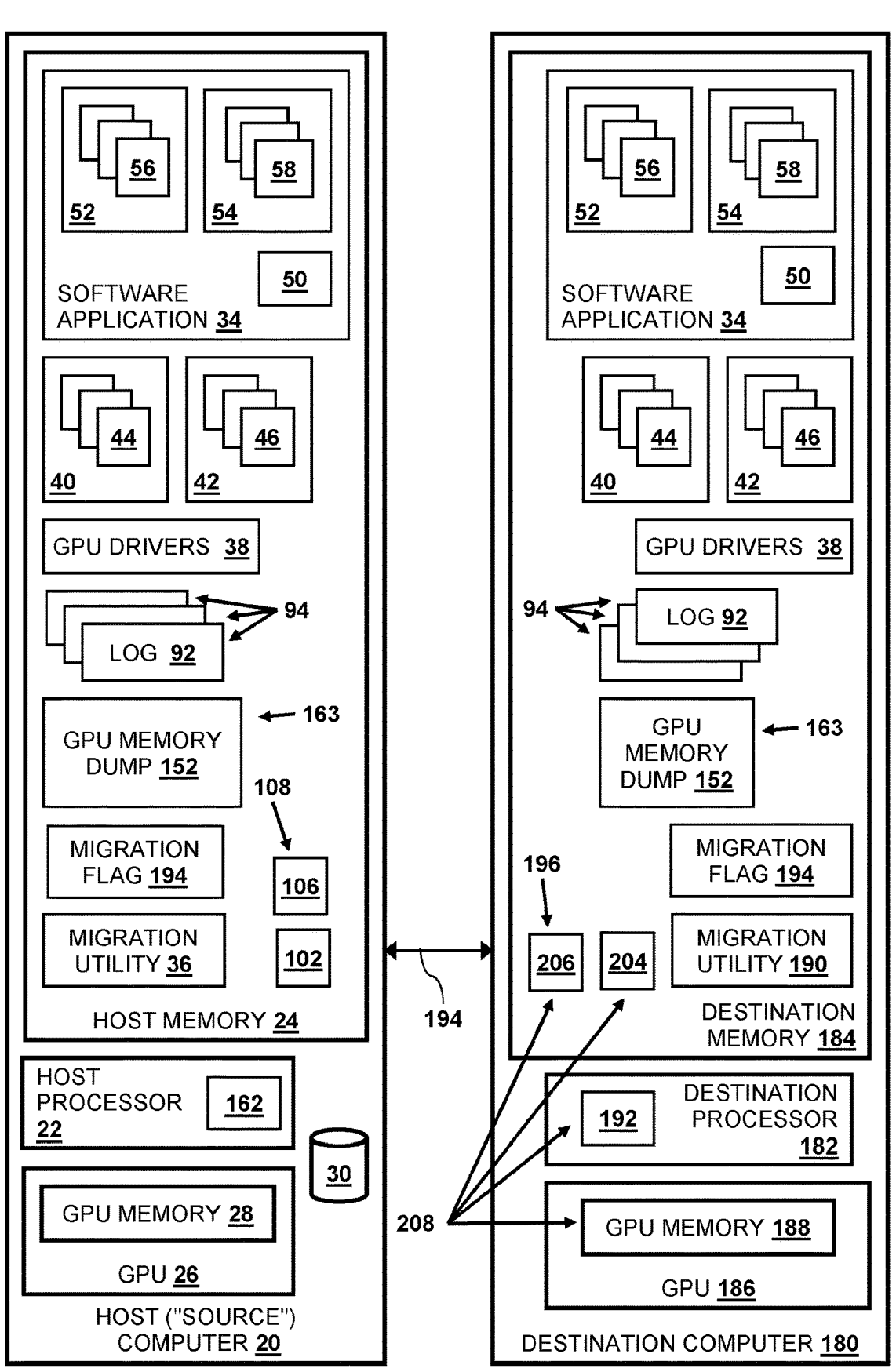
FIG. 9 is a block diagram showing a migration of the suspended software application from the host computer to a destination computer, in accordance with an embodiment of the present invention.

FIG. 9 is a block diagram showing a migration of suspended software application from host computer 20 (i.e., a source computer) to a destination computer 180, in accordance with an embodiment of the present invention. Destination computer 180 may comprise a destination processor 182 comprising registers 192, a destination memory 184, and a destination GPU 186 comprising a destination GPU memory 188. In some embodiments, computer 180 connects to storage device 30 over a network 194 (e.g., a storage area network), so as to enable processor 182 to access storage device 30 even when computer 20 is not operating.

In the configuration shown in FIG. 9, processor 182 executes, from memory 184, a migration utility 190 that is typically identical to migration utility 36 on host computer 20. Additionally, memory 184 comprises additional instances (i.e., copies) of libraries 40, 42 and GPU drivers 38 (e.g., processor 22 executes a first instance of dynamic library 42, and processor 182 executes a second instance of the dynamic library).

In a first embodiment, destination computer 180 may be a different physical computer than source computer 20, and the computers can communicate over a data network (not shown) such as a local area network, a wide area network, or a public network such as the Internet. In a second embodiment, the source and the destination computers comprise a single physical or virtual computer. In the second embodiment, the "migration" simply comprises pausing execution, on computer 20, of software application 34 at a first point in time, and resuming execution (i.e., on the host computer) at a second time subsequent to the first point in time. In these embodiments, source computer 20 and/or destination computer 180 may comprise virtual machines, software containers, grid or data cloud services that execute on one or more (i.e., same or different) physical computers. Therefore, computers 20 and 180 may also be referred to herein as "machines" 20 and 180.

Figure 10:
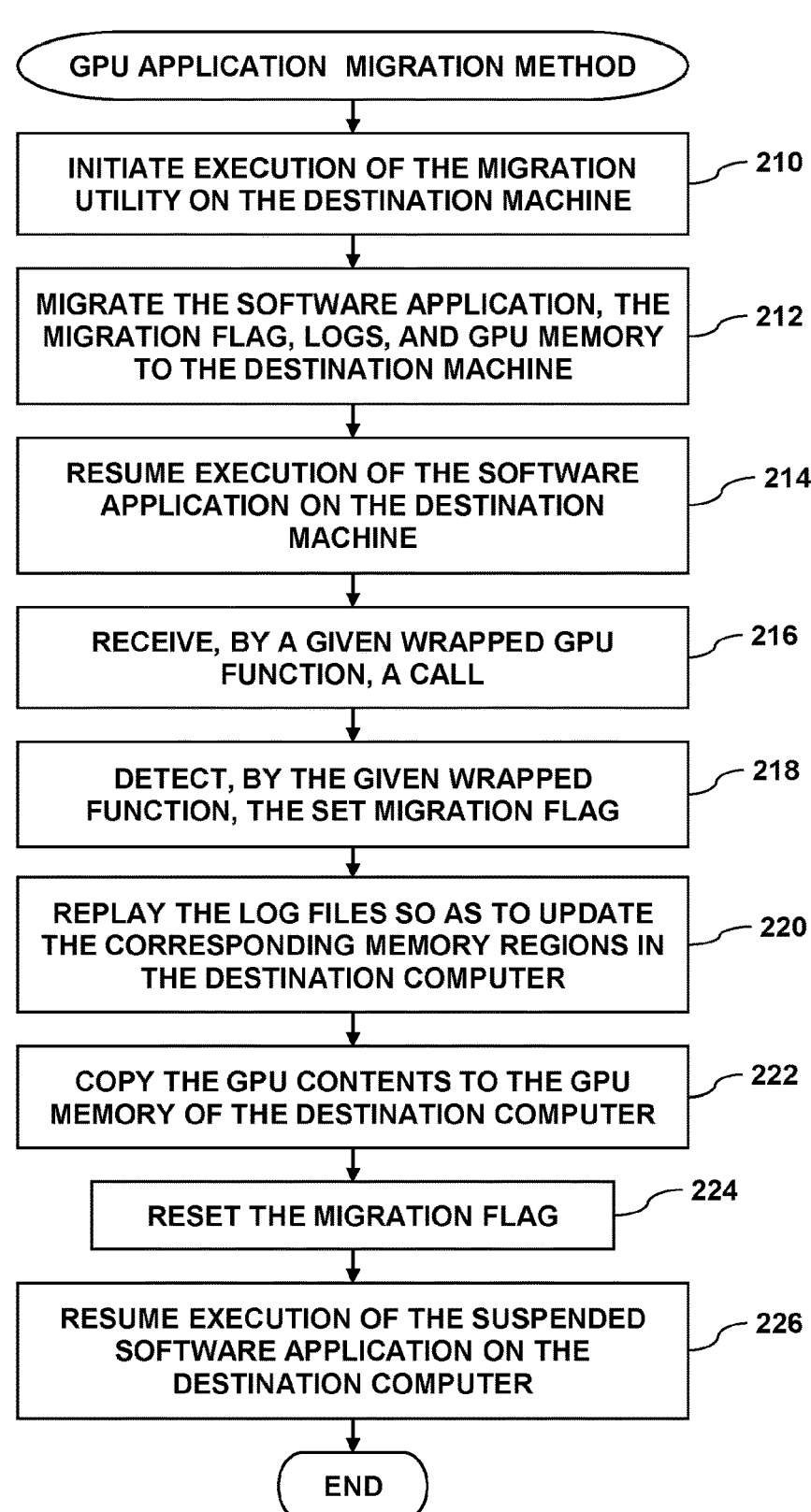
FIG. 10 is a flow diagram that schematically illustrates a method of migrating and resuming execution of the suspended application on a destination computer, in accordance with an embodiment of the present invention.

FIG. 10 is a flow diagram that schematically illustrates a method of migrating suspended software application 34 from source machine 20 to destination machine 180, and resuming execution of suspended software application on the destination machine, in accordance with an embodiment of the present invention.

In step 210, destination machine 180 initiates execution of migration utility 190.

In step 212, migration utility 190 downloads from source machine 20 (i.e., via storage device 30), "cleaned" software application 34, migration flag 194, logs 92 and GPU memory dump 152.

In step 214 the migration utility 190 on destination machine 180 resumes execution of the cleaned software application on the destination machine.

In step 216, a given wrapped GPU function 58 executing on destination machine 180 receives a call from application code 50 executing on the destination machine.

In step 218, the given wrapped GPU function detects that migration flag 190 is set (e.g., to "1" as described supra) and loads dynamic library 42.

In step 220, in response to detecting that migration flag 194 is set, the wrapper function "replays" the entries in logs 92 (i.e., that were recorded by the wrapped GPU functions on source machine 22 when the source machine executed software application 34), GPU library functions 46 so as to update static memory region 204 and to create and update, in memory 184, a set of dynamic library resources 206. In the configuration shown in FIG. 9, dynamic library resources 206 comprise dynamic memory allocations 106, heap memory allocations 108, handles 112, locks 117 and threads 114.

In some embodiments, the entries in logs 92 store calls to functions 44 and 46 while source machine 20 executed software application 34 up to the moment the source machine suspended execution of the software application. While executing software application 34 on the source machine, functions 46 updated dynamic library resources 106 in response to the calls. In these embodiments, replaying, from logs 92, calls to functions 46 on the destination machine 180 updates memory regions 204 and dynamic library resources 206 so that they comprise identical resources 206 to dynamic library resources 106 when source machine 22 suspended execution of software application 34.

In some embodiments, upon loading the dynamic library 42 and replaying log 92, destination machine 180 creates, in memory 184, a static memory region 204 and dynamic library resources 206 comprising dynamic memory allocations 196 that respectively correspond to static memory region 102 and dynamic memory allocations 108. In some embodiments, regions 204 and 102 have identical sizes and are stored at the same memory address in their respective memories 24 and 184. Likewise, memory allocations 108, and memory allocations 196 have identical sizes and are stored at the same memory address in their respective memories 24 and 184.

In step 222, the wrapper function loads GPU memory 188 with data 163 stored in GPU memory dump 152. At this point dynamic library 42 on the destination machine has a library state 208 that is identical to library state 160 (described in the description referencing FIG. 7 hereinabove). In the example shown in FIG. 9, state 160 comprises registers 192, GPU memory 188, and memory 24 (i.e., memory regions 204 and dynamic library resources 206).

In step 224, the given wrapper function resets migration flag 194 (e.g., to "0"). This ensures that subsequent calls to wrapped functions 56 and 58 on destination machine 180 skip steps 216-220 described supra.

Finally, in step 226, host machine 180 calls the GPU library function corresponding to the given wrapper function and the method ends.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method, comprising:

receiving, by a first machine, a request to migrate an application that is executing in a memory of the first machine, wherein the application comprises a first instance of a dynamic library having one or more functions;

generating a log comprising resources allocated to and deallocated from the first instance of the dynamic library in response to executing the application, wherein generating the log comprises recording, by a set of wrapped system library functions, calls from the first instance of the dynamic library to system library functions that allocate and deallocate resources;

suspending execution of the application while the first instance of the dynamic library has a current state;

unloading the first instance of the dynamic library from the memory;

identifying, subsequent to unloading the first instance of the dynamic library, any of the resources that were allocated to the first instance of the dynamic library and that are still pending;

deallocating the identified resources so as to define a cleaned version of the application that does not comprise any of the allocated resources;

migrating the cleaned version of the application to a second machine;

resuming execution of the application on the second machine so as to link the application to a second instance of the dynamic library; and replaying the log so as to bring the linked second instance of the dynamic library on the second machine to the current state.

2. The method according to claim 1, wherein the first instance of the dynamic library controls a stateful hardware peripheral.

3. The method according to claim 2, wherein the stateful hardware peripheral comprises a hardware accelerator.

4. The method according to claim 3, wherein the hardware accelerator comprises a Graphics Processing Unit (GPU) having a GPU memory.

5. The method according to claim 4, wherein the source machine comprises a first GPU, wherein the second machine comprises a second GPU, wherein migrating the cleaned version of the application comprises copying data stored in the GPU memory of the first GPU to the GPU memory of the second GPU, and wherein the current state comprises the data stored in the GPU memory of the first GPU.

6. The method according to claim 2, wherein the current state comprises a current software state, wherein the first machine comprises a first stateful hardware having a current hardware state upon suspending the application, wherein the second machine comprises a second stateful hardware, and wherein replaying the logs brings the second stateful hardware to the current hardware state.

7. The method according to claim 1, wherein a given resource comprises a heap memory allocation, and wherein the current state comprises the heap memory allocation and data stored in the allocated heap memory.

8. The method according to claim 1, wherein a given resource comprises a dynamic memory allocation, and wherein the current state comprises the dynamic memory allocation and data stored in dynamically allocated memory.

9. The method according to claim 1, wherein a given resource comprises a currently allocated device handle, and wherein the current state comprises the currently allocated device handle.

10. The method according to claim 1, wherein a given resource comprises a currently allocated file handle, and wherein the current state comprises the currently allocated file handle.

11. The method according to claim 1, wherein a given resource comprises a thread, and wherein the current state comprises the thread.

12. The method according to claim 1, wherein a given resource comprises a lock, and wherein the current state comprises the lock.

13. The method according to claim 1, wherein the application comprises a set of wrapper functions that call the functions in the first instance of the dynamic library.

14. The method according to claim 13, wherein suspending the application comprises suspending the application upon detecting that none of the wrapper functions are currently executing.

15. The method according to claim 1, wherein identifying the resources comprises recording a first state of the resources prior to loading the dynamic library, recording a second state of the resources upon loading the dynamic library, recording a third state of the resources upon suspending execution of the application, recording a fourth state of the resources upon unloading the dynamic library, wherein the fourth state of the resources comprises log entries in the log comprising resource allocations and deallocations between second and third state, and analyzing the first, the second, the third, the fourth recorded states.

16. The method according to claim 15, wherein recording a given state comprises generating a list of the resources.

17. The method according to claim 15, wherein recording the second state comprises computing a difference in the resource allocations between the first and the second recorded states, wherein recording the third state comprises adding, to the computed difference, the resource allocations recorded in the log, and wherein recording the fourth state comprises computing a difference in resource allocations between the third recorded state unloading the first instance of the library, and subtracting the difference from resources allocated in the third recorded state.

18. The method according to claim 1, wherein the resources that are still pending comprise the resources that are still in the memory, and wherein deallocating the identified resources comprises deallocating the identified resources from the memory.

19. A source computer, comprising:

a memory; and one or more processors configured to receive a request to migrate an application that is executing in the memory of the source computer, wherein the application comprises a first instance of a dynamic library having one or more functions, to generate a log comprising resources allocated to and deallocated from the first instance of the dynamic library in response to executing the application, wherein generating the log comprises recording, by a set of wrapped system library functions, calls from the first instance of the dynamic library to system library functions that allocate and deallocate resources, to suspend execution of the application while the first instance of the dynamic library has a current state, to unload the first instance of the dynamic library from the memory, to identify, subsequent to unloading the first instance of the dynamic library, any of the resources that were allocated to the first instance of the dynamic library and that are still pending, to deallocate the identified resources so as to define a cleaned version of the application that does not comprise any of the allocated resources, and to migrate the cleaned version of the application to a destination computer, so that upon the destination computer resuming execution of the application and linking the application on the destination computer to a second instance of the dynamic library, the destination computer replays the log so as to bring the linked second instance of the dynamic library to the current state.

20. A computer software product for controlling operation of a computer, comprising a non-transitory computer-readable medium, in which program instructions are stored, which instructions, when read by a computer, cause the computer:

to receive, by a first machine, a request to migrate an application that is executing in a memory of the first machine, wherein the application comprises a first instance of a dynamic library having one or more functions;

to generate a log comprising resources allocated to and deallocated from the first instance of the dynamic library in response to executing the application, wherein generating the log comprises recording, by a set of wrapped system library functions, calls from the first instance of the dynamic library to system library functions that allocate and deallocate resources;

to suspend execution of the application while the first instance of the dynamic library has a current state;

to unload the first instance of the dynamic library from the memory;

to identify, subsequent to unloading the first instance of the dynamic library, any of the resources that were allocated to the first instance of the dynamic library and that are still pending;

to deallocate the identified resources so as to define a cleaned version of the application that does not comprise any of the allocated resources; and to migrate the cleaned version of the application to a destination machine, so that upon the destination machine resuming execution of the application and linking the application on the destination machine to a second instance of the dynamic library, the destination machine replays the log so as to bring the linked second instance of the dynamic library to the current state.

* * * * *